UNITED STATES PATENT OFFICE.

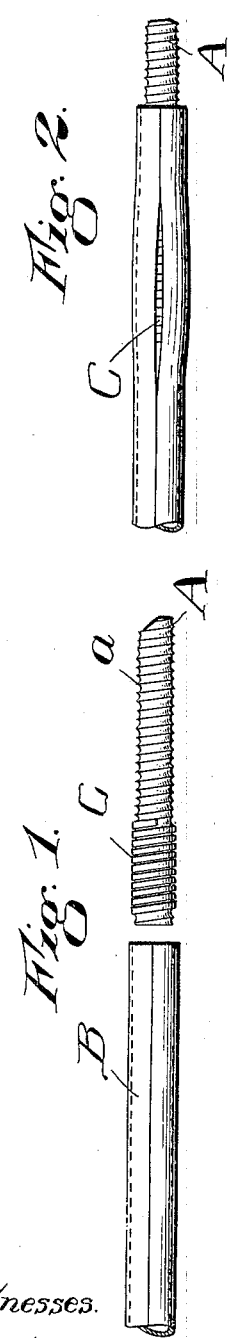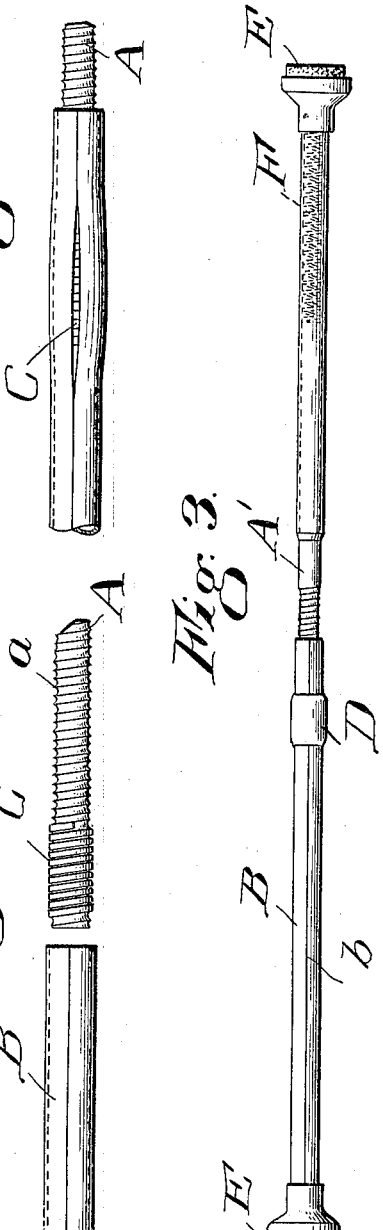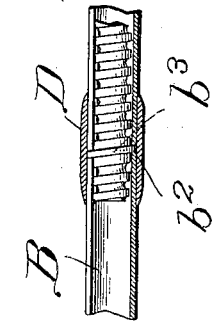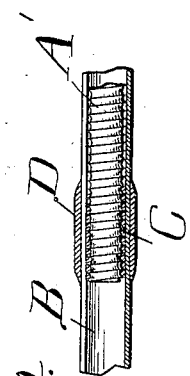

EDWIN W. VAUGHAN, OF WORCESTER, MASSACHUSETTS.

CURTAIN-ROD.

1,112,950.  Specification of Letters Patent.  Patented Oct. 6, 1914.

Application filed August 13, 1913. Serial No. 784,499.

*To all whom it may concern:*

Be it known that I, EDWIN W. VAUGHAN, a citizen of the United States, residing at Worcester, in the county of Worcester and State of Massachusetts, have invented a new and useful Curtain-Rod, of which the following is a specification.

This invention relates especially to the manufacture of extensible metallic curtain rods of that type composed of a tube having a nut and threaded rod for entering said nut, having cushioned disks on the opposite ends of the rod and tube, but parts of the invention can be applied to the manufacture of internally threaded rods for general use.

The principal objects of this invention are to provide a construction of curtain rods suitable for this purpose, the tubular member of which is capable of being formed of open seamed tubing of a comparatively thin and inexpensive character; and to provide a simple, convenient and expeditious means for forming the nut in the tube and holding it securely in position.

Reference is to be had to the accompanying drawings in which—

Figure 1 is a plan of a portion of the two principal parts of a curtain rod constructed in accordance with this invention ready for the first step in assembling. Fig. 2 is a similar view showing the parts in the next position. Fig. 3 is a similar view showing the completed article on a smaller scale. Fig. 4 is a longitudinal, central sectional view of a portion of Fig. 3, and Fig. 5 is a view similar to Fig. 4, showing a modification.

As far as I am aware the construction of curtain rods of this general character heretofore, although carried out in several ways, has been of such a nature that it is practically necessary to employ seamless brass tubing for the tubular member thereof. This brass tubing in order to stand the screw threading to which it is subjected must be of a comparatively heavy character and is expensive. On the other hand, the comparatively thin open seamed steel tubing which comes in similar sizes cannot be provided with the ordinary forms of nuts and screw threads which are used on these articles without considerable expense and serious complications.

One of the principal objects of this invention is to provide a construction and method of manufacture by which thin open seamed steel tubing can be used to advantage with a simple and inexpensive method of manufacture, although some features of the invention are capable of use with seamless tubing, so I do not wish to limit myself in all respects to the use of open seamed tubing. For this purpose I provide a nut inside the open seamed tubing for receiving the threaded rod and I make this nut preferably of one or more pieces of metal separate from the tubing and held in position by means which also securely holds the edges of the open seam of the tube together. This means I arrange in such position, with respect to the projections inside the tubing that constitute the screw thread that it holds the screw thread on both sides thereof so that it is a permanent part of the tube. I also form the threads of the rod in such a way that when any pressure is applied longitudinally in either direction, these threads of the rod will tend to force the thread of the nut outwardly and thus cause them to grip against the interior of the tube more firmly and add to the resistance to the longitudinal pressure.

Referring now, in the first place, to the first four figures of the drawings, it will be seen that one of the principal parts of the curtain rod consists of a threaded rod A provided with a screw thread *a* on the end. These threads are made round at the bottom, that is, each one is substantially semi-circular in cross section although any other form of cross section will accomplish the same results, which has a materially slanting wall on each side of the thread. The other main piece of the curtain rod is in the form of a tube B made preferably of comparatively thin steel or brass open seam tubing. The seam *b* of this tubing when it is purchased is very fine as its edges are in contact.

The first step of the operation of making the connection between the two members A and B according to this embodiment of the invention is to take a coil spring C having an external diameter slightly larger than the interior diameter of the tube and materially larger than the diameter of the rod A, but having the same pitch, and thread it on the end of the rod as shown in Fig. 1. While any convenient shape of wire can be used the ideal method is, to make a wire to the desired form of thread in order to give the greatest possible amount of friction against the walls of the tube. For that purpose a half round wire is shown. The next step of the operation is to force this rod and spring longitudinally into the end of the tube B. This is forced in to the desired distance beyond the end of the tube so as to bring the spring well into the body thereof. On account of the fact that the spring is just slightly too large to enter the tube B without spreading it, the forcing of the spring in this way spreads the seam of the tube. The seam is then closed by a pair of smooth faced dies, not shown. The forcing of the edges of the tube together with smooth grooved dies, compresses the spring without cutting into the metal of the tube and thereby weakening it. At the same time the compressing of the spring greatly increases its friction on the walls of the tube. The next step of the operation consists in passing a seamless cylindrical sheet metal band or ferrule D longitudinally over the tube B from the end at which the spring enters, up to the point where the spring is left. It will be seen that when this band comes over the portion of the tube in which the spring is located it will permanently close up the seam at that point and force the tube still more firmly against the spring, which is still held securely in position on the rod. In this way two results are secured, the spring is permanently united to the interior of the tube so that it cannot be moved longitudinally and so that it constitutes a nut, and the open seamed tube is closed permanently so that it cannot be spread apart by any ordinary usage. In order still more thoroughly to perfect this operation and to finish the article more perfectly, the two ends of the band or ferrule which, of course extend beyond the two ends of the nut, are rolled, die pressed, or otherwise reduced circumferentially so as to unite the ferrule or band firmly to the tube and reduce the tube just beyond the ends of the nut and still more firmly hold the nut in position against longitudinal motion. During all this period the screw is in position so that the nut cannot get out of place while these operations are being performed. It has been found in practice that the nut is practically free from the screw threads during all of these operations, and the screw can be withdrawn without resistance from it. The threaded rod is then withdrawn and the tube is ready for any polishing and other finishing operations to which it may be desired to subject it. The parts are then assembled, either the same rod, or if the rod is a permanent part of the machine, or constitutes a templet, a duplicate A' being applied to the interior threaded tube. In accordance with the usual custom, these two parts are provided with rubber disks E at their ends in any of the ordinary ways and a spring F is provided in either one or both ends as desired.

Another form in which the invention can be carried out is shown in Fig. 5. In this case the parts are all the same with the exception of the nut. In this case the tube is provided with a slot $b^2$ slightly slanted to correspond with the pitch of the screw thread and a wire pin $b^3$ is inserted in this slot. This pin constitutes a separate projection which forms enough of a screw thread to act as a nut. The application of the ferrule to the outside of the tube in this case has an effect similar to that described in connection with the other figures, in that it effectively forces the inner surfaces of the tube against the ends of the pin and holds the pin firmly in the seat formed by the slot. In this case as in the other, the nut, that is the pin, comes about at the center of the ferrule and the ferrule preferably is reduced at the ends. It will be observed that the threads of the screw as has been stated, are shown as rounded at the bottom and substantially semi-circular in cross section. This not only furnishes a shallow bottom so that the threads of the nut cannot become wedged into them but it also furnishes slanting walls to the threads on both sides. As the threads of the nut are materially smaller than the threads of the rod it will be obvious that the exertion of any force tending to push the rod into the tube or to pull it out will cause the threads of the nut to ride up on the threads of the rod, and thus force the former outwardly against the walls of the tube and cause them to bind on the tube still more firmly. Thus, when the only force that is likely to be applied that would tend to dislodge the nut is exerted, its first effect is to make the nut stronger and more firmly anchored in the tube.

Although I have illustrated and described only two forms of the invention and described them both as applied to a particular kind of tube, I am aware of the fact that other modifications can be made therein and that the invention can be applied to other kinds of tubes without departing from the scope of the invention as expressed in the claims, therefore, I do not wish to be limited in these respects or to all the details of construction shown, but What I do claim is:—

1. As an article of manufacture, an extensible curtain rod comprising a tube, a screw threaded rod adapted to enter said tube, said tube having a screw thread on the inside thereof at a distance from the end and adapted to engage the threads of said rod, and a fixed separate metallic band surrounding said tube outside said thread at a distance from the end of the tube.

2. As an article of manufacture, an extensible curtain rod comprising an open seam tube, a screw threaded rod adapted to enter said tube, a member on the inside of said tube at a distance from its end constituting a thread adapted to engage the threads of said rod, and a seamless metallic band surrounding said tube, fixed thereto, extending beyond said thread member in both directions and holding it in condition to prevent the disengagement of said member from the tube.

3. As an article of manufacture, an extensible curtain rod comprising a sheet metal tube, a screw threaded rod adapted to enter said tube, said tube having on the inside thereof at a distance from its end, a thread member adapted to engage the threads of said rod, and a metallic band surrounding said tube outside said thread member and extending beyond the same in both directions longitudinally, said band gripping the tube on both sides of said member and holding it firmly against expansion and holding the thread member.

4. As an article of manufacture, an extensible curtain rod comprising a tube, a screw threaded rod adapted to enter said tube, a coiled spring member fixed to the inside of the tube having a normal external diameter slightly greater than the interior diameter of the tube and adapted to engage the threads of said threaded rod, and a metallic band surrounding said tube, said band at both ends gripping the tube at points on opposite ends of said coiled spring member to hold the tube and member securely together.

5. As an article of manufacture, an extensible curtain rod comprising a tube, a screw threaded rod adapted to enter said tube, said tube having on the inside thereof a wire adapted to engage the threads of said rod, and a seamless metallic band surrounding said tube and extending beyond said member longitudinally in both directions and reduced in diameter at its ends to cause it to grip said tube firmly at opposite sides of said wire.

6. As an article of manufacture, an extensible curtain rod comprising a tube, a screw threaded rod adapted to enter said tube, said tube having fixed on the inside thereof a member adapted to engage the threads of said threaded rod, and a seamless metallic band surrounding said tube, said tube having an open seam along the side thereof and said band gripping the tube to hold the edges of the seam together and secure the member in position inside the same.

7. As an article of manufacture, a curtain rod comprising a thin sheet metal open seam tube having a coiled spring inserted therein at a distance from the end thereof, and securely held in position, and a screw threaded rod adapted to enter the tube and fit said coiled spring, whereby the spring acts as a nut for the rod.

8. As an article of manufacture, a curtain rod comprising a thin sheet metal open seam tube having a coiled spring inserted therein at a distance from the end thereof, and a screw threaded rod adapted to enter the tube and fit said coiled spring, whereby the spring acts as a nut for the rod.

9. As an article of manufacture, an extensible curtain rod comprising a tube having an open seam throughout the length thereof and provided with a separate thread inside the same, and having a seamless tubular band surrounding it at the point where said thread is located, and a threaded rod adapted to enter the end of said tube and having a screw thread fitting the internal thread whereby the latter constitutes a nut for said threaded rod.

10. As an article of manufacture, an extensible curtain rod comprising a sheet metal tube having an open seam and provided with a separate thread inside the same, and having a band surrounding it at the point where said thread is located, said band fitting the exterior of said tube tightly so as to draw up the open edges of the same and secure them firmly together, and a threaded rod adapted to enter the end of said tube and having a screw thread fitting the thread inside the tube.

11. As an article of manufacture, an extensible curtain rod comprising a tube having an open seam and provided with a coil inside the same and constituting a nut, and having a band surrounding it at the point where said coil is located, said band being contracted at its ends so as to grip the exterior of the tube tightly on opposite sides of said coil whereby the edges of the tubular portion are clamped together and the tube reduced in diameter at points adjacent to the ends of said coil for holding the coil securely in position in the tube.

12. As an article of manufacture, an extension curtain rod comprising a sheet metal tube having an open seam and provided with a separate thread inside the same, and having a band surrounding it at the point where said thread is located, and a threaded rod adapted to enter the end of said tube and having a screw thread fitting the thread whereby said spring constitutes a nut for said threaded rod, said screw threaded rod being provided with rounded bottomed threads slanting on both sides.

13. As an article of manufacture, an extensible curtain rod comprising a tube having on the inside thereof a wire held in position therein, and a threaded rod provided with shallow threads having their edges slanted in opposite directions whereby in case of the application of longitudinal pressure the effect of said threads will be to force the wire outwardly.

14. As an article of manufacture, an extensible curtain rod comprising a tube having on the inside thereof a half round wire held in position therein with the convex side in, and a threaded rod provided with shallow threads having their edges slanted in opposite directions whereby in case of the application of longitudinal pressure the effect of said threads will be to force the wire outwardly.

In testimony whereof I have hereunto set my hand, in the presence of two subscribing witnesses.

EDWIN W. VAUGHAN.

Witnesses:
ALBERT E. FAY,
C. FORREST WESSON.

Copies of this patent may be obtained for five cents each, by addressing the "Commissioner of Patents, Washington, D. C."